United States Patent
Lu

(10) Patent No.: US 10,880,101 B2
(45) Date of Patent: Dec. 29, 2020

(54) METHOD AND CIRCUIT FOR DE-BIASING PUF BITS

(71) Applicant: Taiwan Semiconductor Manufacturing Co., Ltd., Hsin-Chu (TW)

(72) Inventor: Shih-Lien Linus Lu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 345 days.

(21) Appl. No.: 15/950,635

(22) Filed: Apr. 11, 2018

(65) Prior Publication Data

US 2019/0319810 A1    Oct. 17, 2019

(51) Int. Cl.
| H04L 29/06 | (2006.01) |
| H04L 9/32 | (2006.01) |
| G11C 11/419 | (2006.01) |
| H03K 19/21 | (2006.01) |

(52) U.S. Cl.
CPC .......... *H04L 9/3278* (2013.01); *G11C 11/419* (2013.01); *H03K 19/215* (2013.01)

(58) Field of Classification Search
CPC ... H04L 9/3278; H04L 9/0866; H04L 9/0662; G06F 7/588; G11C 7/24; G11C 11/419; H03K 19/215
See application file for complete search history.

(56) References Cited

U.S. PATENT DOCUMENTS

| 8,593,854 | B1 | 11/2013 | Chih et al. |
| 8,605,523 | B2 | 12/2013 | Tao et al. |
| 8,630,132 | B2 | 1/2014 | Cheng et al. |
| 8,760,948 | B2 | 6/2014 | Tao et al. |
| 8,869,436 | B2 | 10/2014 | Tsai et al. |
| 8,908,421 | B2 | 12/2014 | Liaw |

(Continued)

FOREIGN PATENT DOCUMENTS

EP    2950201 A1    12/2015

OTHER PUBLICATIONS

Suresh, V.B., "On-chip True Random Number Generation in Nanometer CMOS," University of Massachusetts Amherst, Department of Electrical and Computer Engineering, Feb. 2012.

(Continued)

*Primary Examiner* — Yogesh Paliwal
(74) *Attorney, Agent, or Firm* — Duane Morris LLP

(57) ABSTRACT

A device includes an array including a plurality of bit generating cells arranged in a plurality of rows and columns and a PUF generator. The PUF generator includes a plurality of column multiplexers, each column multiplexer coupled to a plurality of the columns from the array; a plurality of sense amplifiers, each sense amplifier being associated with a respective one of the column multiplexers; and a plurality of de-biasing circuits, each de-biasing circuit associated with a respective column multiplexer and coupled to an output of a respective one of the sense amplifiers. Each de-biasing circuit is operable to provide an output for generating a PUF signature that is dependent on more than one sensed bit from the bit generating cells associated with the columns coupled to the de-biasing circuit's respective column multiplexer, whereby a sensing bias of the sense amplifier to which the de-biasing circuit is coupled is reduced.

20 Claims, 8 Drawing Sheets

(56) References Cited

U.S. PATENT DOCUMENTS

| | | |
|---|---|---|
| 8,929,160 B2 | 1/2015 | Katoch et al. |
| 8,964,492 B2 | 2/2015 | Hsu et al. |
| 8,982,643 B2 | 3/2015 | Lum |
| 9,019,743 B2 | 4/2015 | Tsai et al. |
| 9,023,699 B2 | 5/2015 | Chang et al. |
| 9,053,781 B2 | 6/2015 | Tsai et al. |
| 9,076,522 B2 | 7/2015 | You et al. |
| 9,117,510 B2 | 8/2015 | Yang et al. |
| 9,153,343 B2 | 10/2015 | Chu et al. |
| 9,196,360 B2 | 11/2015 | Chou et al. |
| 9,208,858 B1 | 12/2015 | Lin et al. |
| 9,218,872 B1 | 12/2015 | Liaw |
| 9,224,470 B1 | 12/2015 | Chiu et al. |
| 2007/0147156 A1 | 6/2007 | Nishino |
| 2011/0022648 A1 | 1/2011 | Harris |
| 2012/0140545 A1 | 6/2012 | Kim |
| 2012/0182786 A1 | 7/2012 | Baek |
| 2013/0234094 A1 | 9/2013 | Chang et al. |
| 2014/0040338 A1 | 2/2014 | Van Der Sluis |
| 2014/0108786 A1 | 4/2014 | Kreft |
| 2014/0153345 A1 | 6/2014 | Kim et al. |
| 2014/0166961 A1 | 6/2014 | Liao et al. |
| 2014/0203236 A1 | 7/2014 | Chen et al. |
| 2014/0233330 A1 | 8/2014 | Ko et al. |
| 2014/0264222 A1 | 9/2014 | Yang et al. |
| 2014/0264233 A1 | 9/2014 | Tu et al. |
| 2014/0268994 A1 | 9/2014 | Rose |
| 2014/0293674 A1 | 10/2014 | Johnson |
| 2015/0048297 A1 | 2/2015 | Hsieh et al. |
| 2015/0085558 A1 | 3/2015 | Chang et al. |
| 2015/0109849 A1 | 4/2015 | Tsai et al. |
| 2015/0109850 A1 | 4/2015 | Chang et al. |
| 2015/0170741 A1 | 6/2015 | Chih et al. |
| 2015/0269997 A1 | 9/2015 | Lin et al. |
| 2015/0348598 A1 | 12/2015 | Wang et al. |
| 2015/0364187 A1 | 12/2015 | Kim |
| 2015/0371702 A1 | 12/2015 | Wu et al. |
| 2015/0380063 A1 | 12/2015 | Chang et al. |
| 2015/0380077 A1 | 12/2015 | Wu et al. |
| 2015/0380078 A1 | 12/2015 | Liaw |
| 2016/0276027 A1 | 9/2016 | Lin |
| 2016/0335200 A1 | 11/2016 | Cambou |
| 2017/0046129 A1* | 2/2017 | Cambou ............... H04L 9/0866 |
| 2017/0048072 A1 | 2/2017 | Cambou |
| 2017/0063546 A1* | 3/2017 | Zhang ................... H04L 9/0877 |
| 2018/0006813 A1* | 1/2018 | Van Der Leest ........ G09C 1/00 |
| 2018/0013431 A1* | 1/2018 | Bury ........................ G09C 1/00 |
| 2018/0046436 A1 | 2/2018 | Lu |
| 2018/0052782 A1 | 2/2018 | Cambou |
| 2018/0069711 A1 | 3/2018 | Lu |
| 2018/0102163 A1 | 4/2018 | Lin |
| 2018/0102907 A1 | 4/2018 | Lin |

OTHER PUBLICATIONS

Holcomb, D.E. et al., "Initial SRAM State as a Fingerprint and Source of True Random Numbers for RFID Tags," Proceedings of the Conference on RFID Security, Jul. 2007.

Non-Final Office Action dated Nov. 15, 2017, in corresponding U.S. Appl. No. 15/234,842.

Notice of Allowance dated Mar. 9, 2018, in corresponding U.S. Appl. No. 15/234,842.

Non-Final Office Action dated Sep. 22, 2017, in corresponding U.S. Appl. No. 15/435,082.

Notice of Allowance dated Feb. 13, 2018, in corresponding U.S. Appl. No. 15/435,082.

Non-Final Office Action dated Mar. 6, 2018, in corresponding U.S. Appl. No. 15/288,342.

* cited by examiner

METHOD AND CIRCUIT FOR DE-BIASING PUF BITS

BACKGROUND

With the increasing use of electronic devices utilizing integrated circuits to provide different types of information for a variety of different applications, there has been an increasing need to adequately protect sensitive and/or critical information that may be stored within an electronic device to limit access to such information to only such other devices that have permission to access the information. Some examples of applications include the authentication of devices, protection of confidential information within a device, and securing a communication between two or more devices.

A physically unclonable function (PUF) is a physical structure generally within an integrated circuit that provides a number of corresponding outputs (e.g., responses) in response to inputs (e.g., challenges/requests) to the PUF. Each PUF provides one or more sets of request-response pairs. An identity of the integrated circuit may be established by such request-response pairs provided by the PUF. With the establishment of the identity, secure communication can be provided between devices. The PUF can also be used for existing authentication purposes to replace the current method of assigning an identity to an electronic device. Since the PUF is based on intrinsic properties of a manufacturing process, the PUF has various advantages over conventional authentication approaches that inscribe an identity on a device which may be mimicked and/or reverse engineered more easily.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1:
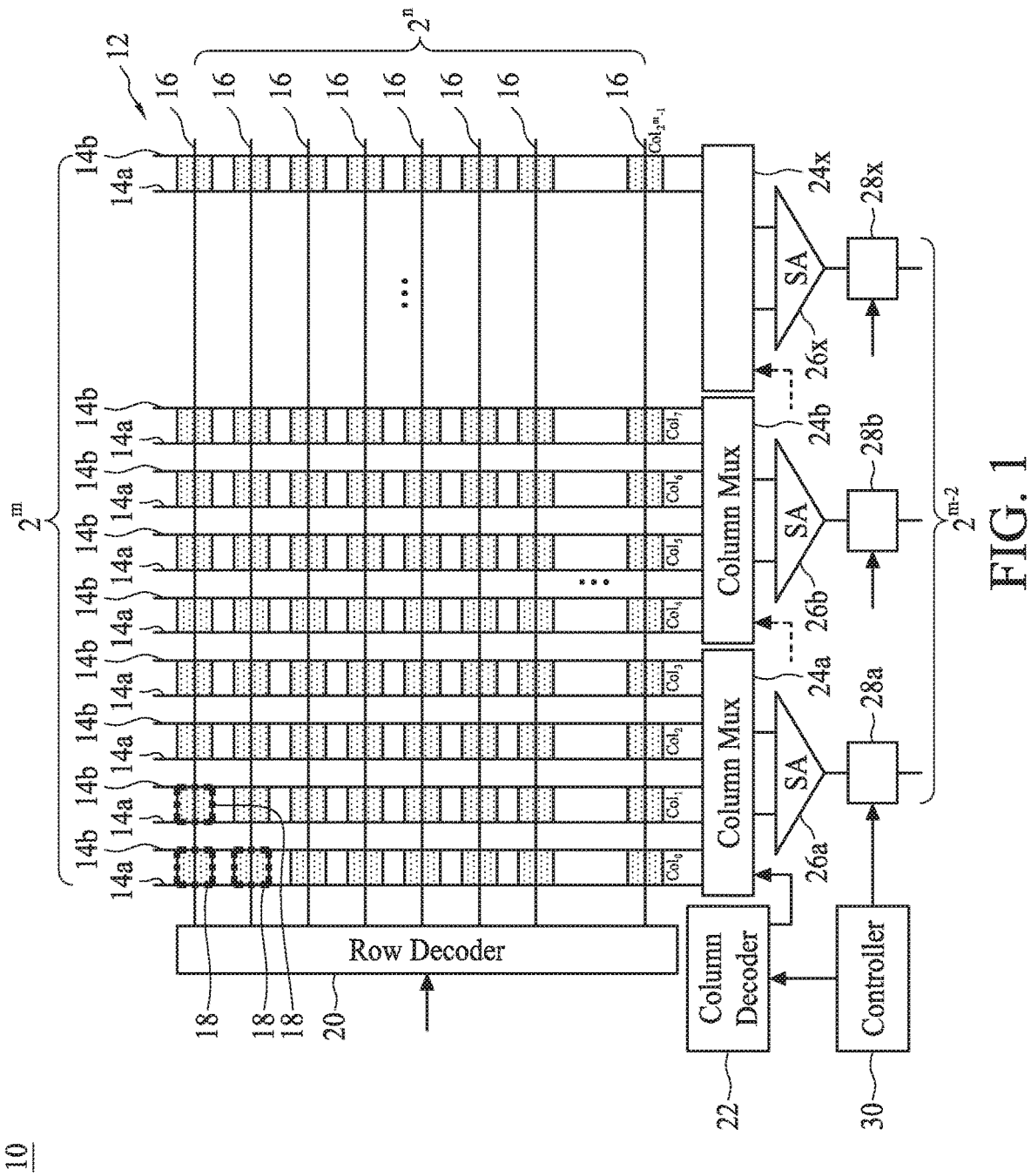
FIG. 1 illustrates an integrated circuit device having an array of bit generating cells and associated circuitry for generating a PUF bit vector, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

Although manufactured in high volumes, each integrated circuit (IC) is unique due to the physical randomness even with the same manufacturing process and the same material. This inherent variation can be extracted and used as its unique identification, as DNA to human beings. Recently, security researchers have proposed a physical "function" called Physically Unclonable Function (PUF). A PUF in cryptography is a physical object that is easy to evaluate and produce an output, but the output is very hard to predict. A PUF can be used as a unique identification or key in secure computing and communication. A PUF should have the following properties:

Uniqueness (individualism): each PUF is distinctive and different from all other PUFs on the same chip or on other chips.

Inherent (born with): each PUF generates its unique output based on intrinsic properties of the PUF.

Unclonable (cannot be mimicked or duplicated): it is impossible to make an exact replica even when the exact manufacturing process is used.

Repeatable (reliable): the output of a PUF should not be affected by the operation environment and age.

A PUF is generally used for authentication and secret key storage without requiring secure electrically erasable programmable read-only memory (EEPROMs) and/or other expensive hardware (e.g., battery-backed static random-access memory) and/or some other kinds of non-volatile memory. As described above, instead of storing secrets in a digital memory, the PUF derives a secret from physical characteristics of an integrated circuit (IC). A PUF generates a deterministic random bit vector. This bit vector is constructed leveraging static random process variations that exist on a chip. Two identically designed chips, even though manufactured in the same batch, still exhibit differences. These differences are harvested to generate the unique bit vector. This bit vector can be used as a signature (an ID or a DNA) for security purposes. PUF's leverage this variability to derive "secret" information that is unique to each of the ICs (e.g., a silicon "biometric"). Generally, such secret information is referred to as a "PUF signature" of the IC. In addition, due to the manufacturing variability that defines the signature, one cannot manufacture two identical ICs even with full knowledge of the IC's design. Various types of variability of an IC can be used to define such a signature such as, for example, gate delay(s), threshold voltage(s), power-on state(s) of a static random-access memory (SRAM) device, and/or any of a variety of physical characteristics of an IC.

One type of PUF is based on SRAM. A SRAM cell is the smallest functional unit of a digital IC chip. It is used to evaluate the yield of a new technology and thus is available across all nodes. Moreover, due to its small physical size, a small static physical dimension deviation translates to a large percentage difference, which lends itself nicely to building a PUF. A PUF can leverage the "sense amplifier" of each cell that is formed from a pair of crossed coupled inverters. However, the sense amplifier can have an offset that introduces bias. If the sense amplifier has an offset towards one direction there is a tendency to have more output bits biased toward that direction. Since the big part of the sense amplifier offset is also random, if there are many sense amplifiers then the overall bias is balanced. Sense amplifier offset becomes more problematic in PUF when the number of columns is small.

The offset in the sense amplifier is due to transistor mismatch in the supposedly identical matched transistor pair. This mismatch results from process variations such as random dopant number fluctuations, interface-state density fluctuations and other variations. A sense amplifier of an SRAM array's function is to detect the small voltage difference (~10 mV to 80 mV, for example) between bitline and bitline_bar. It outputs a logical 1 if bitline has a higher voltage than bitline_bar, for example, and a logical 0 if bitline_bar has a higher voltage. This difference of voltage results from the stored value in the SRAM cell. An offset of a sense amplifier skews the outcome of this detection function. If the offset is in favor of the bitline side then even though the voltage at the bitline_bar side is slightly higher (but the difference may not be enough to over-come the SA offset) the output will still be a 1. This gives rise to the bias in output bits.

Another form of PUF is based on speed difference. This approach uses either a full SRAM or a simplified SRAM cell, which is basically two discrete transistors addressed by the same word line but coupled to different bitlines (e.g., bitline and bitline_bar for a full SRAM cell). This approach depends on the sense amplifier to tell the difference between read speeds between adjacent cells (in the case of a full SRAM cell), or between adjacent transistors at a cell location. As two bitlines develop a difference in voltage, this voltage difference is sensed by the sense amplifier. However, if the sense amplifier has an offset towards one direction, there is a tendency to have more outputs buts biased towards that direction. This bias in output bits is highly undesirable.

The transistor mismatch in the sense amplifier is expected to get worse with technology scaling due to the demanding requirements on process tolerance. Therefore, it is recognized that it is extremely important to develop the techniques to reduce the bias due to sense amplifier offset in PUF, particularly in applications that use the "speed-compare" style of PUF. In embodiments described herein, an algorithm (and circuitry implementing the same) that utilizes the concept of compression (with or without averaging) is implemented to reduce bias attributed to the sense amplifier offset in PUF.

Due to the layout physical dimension disparity of an SRAM cell and a sense amplifier, many columns of SRAM cells usually share a single sense amplifier. This is possible because SRAM read is non-destructive (unlike DRAM). There is no need to write back the read data into the storage cells after a read operation. Column selection logic is used to multiplex among several bitlines as inputs to an associated sense amplifier.

In order to achieve inter-device uniqueness for a PUF design, it is desirable to make sure the deterministic random bits generated do not have any bias toward 0 or 1. In the worst case, if all bits are 0 or 1 (total bias), there is no way a PUF on different chips can be unique. This translates to an Inter-Hamming Distance (Inter-HD) of 0. The best case is that all chips Inter-HD go towards 50% (0.5). Any bias toward 0 or 1 tends to reduce the Inter-HD from 0.5.

The basic idea behind embodiments of the de-biasing techniques described herein is to utilize a logical XOR function to remove bias. In particular, the XOR function is used on multiple bits sensed or generated from the same sense amplifier and thus share the same potential sense amplifier bias. The XOR logical operation has a truth table that gives balanced output bit in 0 and 1. Given two inputs of the XOR gate as 00, 01, 10, 11, the respective output is balanced, i.e., 0, 1, 1, 0. Another function that has the similar balanced property is the XNOR function. As such, in certain embodiments, XNOR logic may be used.

With simple XOR (or XNOR), bias (B) can be reduced by $2B^2$. This can be shown with a simple probability calculation. Let it be assumed that the outcome of a coin toss is biased toward HEAD (1) with a probability of 0.6 instead of 0.5, a bias of 0.1. Therefore the probability of arriving at TAIL (0) is only 0.4. Now there are 4 different possible permutations for two coin tosses—HH, TH, HT and TT representing 11, 01, 10, 00. The probability of getting these four different outcomes are 0.6*0.6 (i.e., 0.36), 0.6*0.4 (i.e., 0.24), 0.4*0.6 (i.e., 0.24), and 0.4*0.4 (0.16), respectively. The output of a XOR operation on possible outcomes of these four coin tosses is 0, 1, 1, 0 (corresponding to HH, TH, HT and TT). This means the resulting outcome has a 0.36+0.16 (0.52) chance of being a 1 (because there is a 0.36 chance of getting HH and a 0.16 chance of getting TT, both of which provide a XOR output of 1) and 0.24+0.24 (0.48) chance of being a 0 (because there is a 0.24 chance of getting TH and a 0.24 chance of getting HT, both of which provide a XOR output of 0). It can be seen that the bias is reduced from 0.1 (10%) to 0.02 (2%). To make it more general, we assume the probability of getting a 1 is (0.5+B), where B is the bias. This means that the probability of getting a 0 is (0.5−B). The combined probability of getting a 10 and 01 is $2*(0.5^2-B^2)$ (i.e., (0.5−B)*(0.5+B)+(0.5−B)*(0.5+B)), which is $0.5-2B^2$. A smaller B such as 0.04 (4%), for example, can be reduced to 0.0032 (0.32%), which is $2B^2$.

Figure 7:
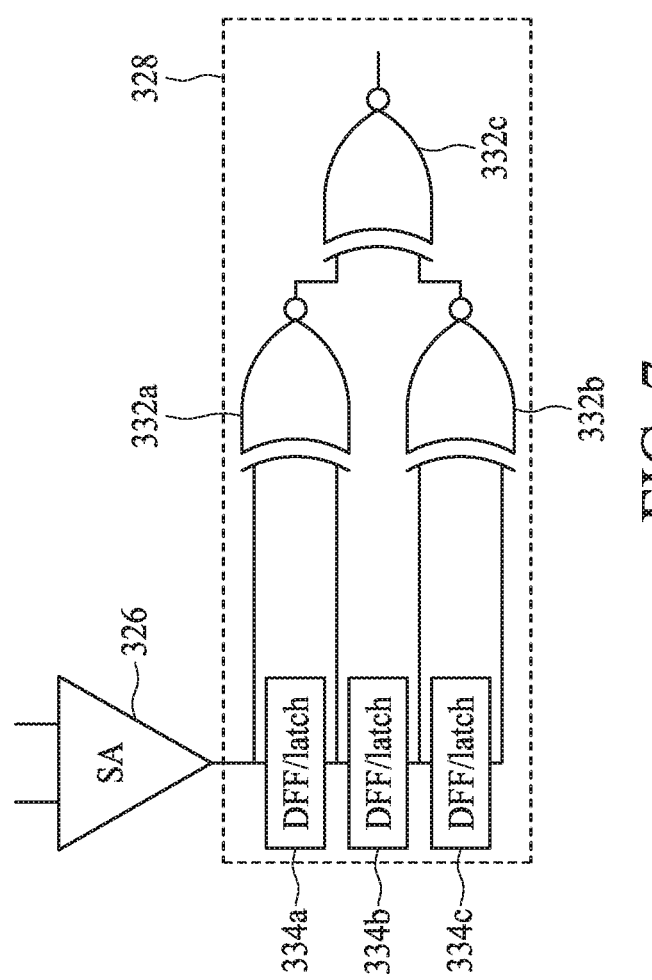
FIG. 7 illustrates another compression circuit for use with the integrated circuit device of FIG. 1, in accordance with some embodiments.

It can be seen that if we repeat this process one more time we can further reduce the bias. For example, 4n bits can be compressed to n bits, e.g., by performing a logical XOR on two pairs first then a logical XOR on the output of these two XOR pairs. This arrangement is shown in FIG. 7 and discussed in more detail in connection therewith. The reduction will be from B to $4B^4$. Using the same example of a smaller B such as 0.04 (4%), the resulting bias is reduced to 0.00001024 (18 0.001%).

In certain embodiments, a de-biasing circuit (also referred to herein in certain embodiments as a compressor circuit) is coupled to each of the sense amplifiers. This de-biasing circuit will perform a simple logical operation, for example a XOR or XNOR of outputs of the sense amplifier, as described below.

In embodiments, multiple bits are read from bitlines in the same column MUX group that share the same sense amplifier and the multiple bits are operated on by XOR logic to form a new bit. This compression circuit (XOR (or XNOR) gate plus a latch circuit, in embodiments described below) is built next to the sense amplifier. Since these bits all share the same sense amplifier, any bias from the sense amplifier offset is reduced. In embodiments, a combinatorial method for combining these bits in sequence is used so there is no loss of signature bits, i.e., there is averaging without overall compression or with reduced overall compression.

Figure (FIG. 1) illustrates an embodiment of an integrated circuit device 10 with an array 12 of bit generating cells and a physically unclonable function (PUF) generator implementing 4:1 column multiplexing. It should be understood that 4:1 column multiplexing is used solely for purposes of illustration and without loss of generality. The techniques illustrated in FIG. 1 and described below can be applied to other integer ratios of multiplexing, e.g., 2:1, 3:1, 5:1, etc. The integrated circuit device 10 includes an array 12 of what are referred to herein as bit generating cells 18. Each cell 18 location is accessed via a respective wordline 16 and bitline/bitline_bar pair 14a/14b combination. In embodiments, the each cell is an SRAM cell. In certain embodiments, each cell consists of two independent transistors, coupled at their gates to the same wordline, with the first transistor having a source/drain terminal coupled to bitline 14a and the second transistor coupled having its source/drain terminal coupled to bitline_bar 14b.

The integrated circuit device 10 includes a row decoder 20 for decoding an address and selecting a wordline 16 and a column decoder 22 for decoding an address and selecting a bitline 14/bitline_bar pair. In the illustrated embodiment, there are $2^n$ total number of rows and $2^m$ total number of columns. Sense amplifiers 26a, 26b to 26x are each associated with a respective 4:1 column multiplexer 24a, 24b to 24x. The nomenclature "x" is used for simplicity sake to represent "$2^{m-2}$", i.e., $2^m$ divided by 4. Each column multiplexer 24 is coupled to four columns, i.e., to four bitline pairs 14a, 14b. For example, the bitline pairs 14a, 14b of Column(0) to Column(3) are coupled to first column multiplexer 24a, which is coupled to first sense amplifier 26a; the bitline pairs 14a, 14b of Column(4) to Column(7) are coupled to second column multiplexer 24b, which is coupled to second sense amplifier 26b; and bitline pairs 14a, 14b of Column($2^{m-4}$) to Column($2^{m-1}$), are coupled to $x^{th}$ column multiplexer 24x, which is coupled to $x^{th}$ sense amplifier 26x. The columns coupled to the same sense amplifier 26 are subject to the same sense amplifier offset leading to the same potential sense biases.

The output of each sense amplifier 24 is coupled to a respective de-biasing circuit 28, i.e., sense amplifier 26a is coupled to de-biasing circuit 28a; sense amplifier 26b is coupled to de-biasing circuit 28b; and sense amplifier 28a is coupled de-biasing circuit 28x. In embodiments, the de-biasing circuit is a compressor circuit as described below. The controller 30 is coupled to the column decoder 22, which is coupled to the column multiplexers 24, and the de-biasing circuits 28. The controller 30 is used to sequence the steps for generating de-biased signature bits, i.e., a de-biased signature vector. In embodiments, the controller 30 is a finite state machine. Embodiments of these sequencing steps are discussed below in connection with FIGS. 4-5.

For each sense amplifier 26 there is a corresponding de-biasing circuit 28. The de-biasing circuit 28 should be simple and small, so that it can fit within the SRAM cell pitch like the sense amplifier. In embodiments, the de-biasing circuit includes an XOR gate (or XNOR gate) and a latch circuit, such as a D flip-flop. As those of skill in the art will understand, the D flip-flop captures the value of the D-input at a definite portion of the clock cycle (such as the rising edge of the clock). That captured value becomes the Q output. At other times, the output Q does not change. The D flip-flop can be viewed as a memory cell, a zero-order hold, or a delay line. It should be understood that other latches that implement similar functionality for facilitating the purpose of the de-biasing discussed herein may also be used. The use of column multiplexing helps to give more space for the sense amplifier and the de-biasing circuit. The function of compression (or averaging as described below) requires multiple reads for each PUF access to produce signature bits. All bitlines are precharged in this case and only one row (i.e., wordline) is activated at a time. Column circuitry isolates each read of the of the multiple reads to the same column group. As described below, in embodiments, the sense amplifier needs to be cycled multiple times.

The column multiplexers 24, sense amplifiers 26, de-biasing circuits 28, and controller 30 can collectively be considered a PUF generator or an authentication circuit.

Figure 2:
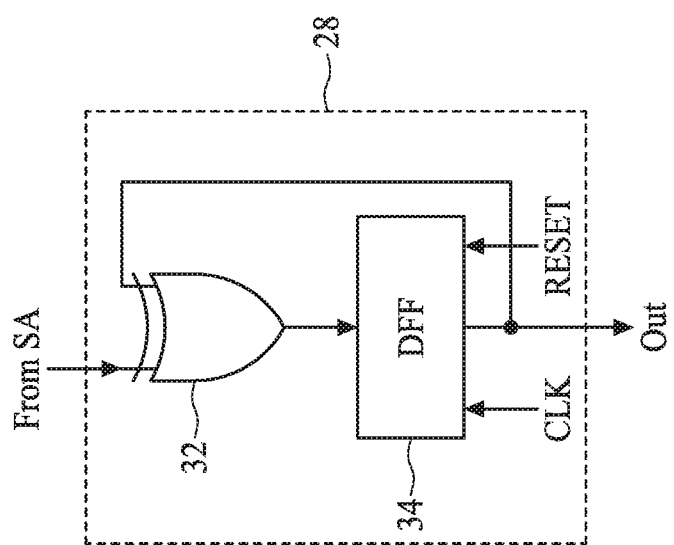
FIG. 2 illustrates an embodiment of a compression circuit for use with the integrated circuit device of FIG. 1, in accordance with some embodiments.

FIG. 2 illustrates an embodiment of a de-biasing circuit 28 that can compress multiple bit reads (i.e., senses by the same sense amplifier of multiple bit generating cells 18) into a single output PUF bit. The compressor includes a XOR gate 32 and a latch, such as a D flip-flop 34. The inputs to the XOR gate include the output from the sense amplifier, i.e., a sense amplifier 26 from FIG. 1, and the Q output of the D flip-flop 34. The D flip-flop also includes a clock input for receiving a clock signal CLK and a reset input for receiving a RESET signal. In embodiments, the XOR gate can be replaced with a XNOR gate.

Figure 3:
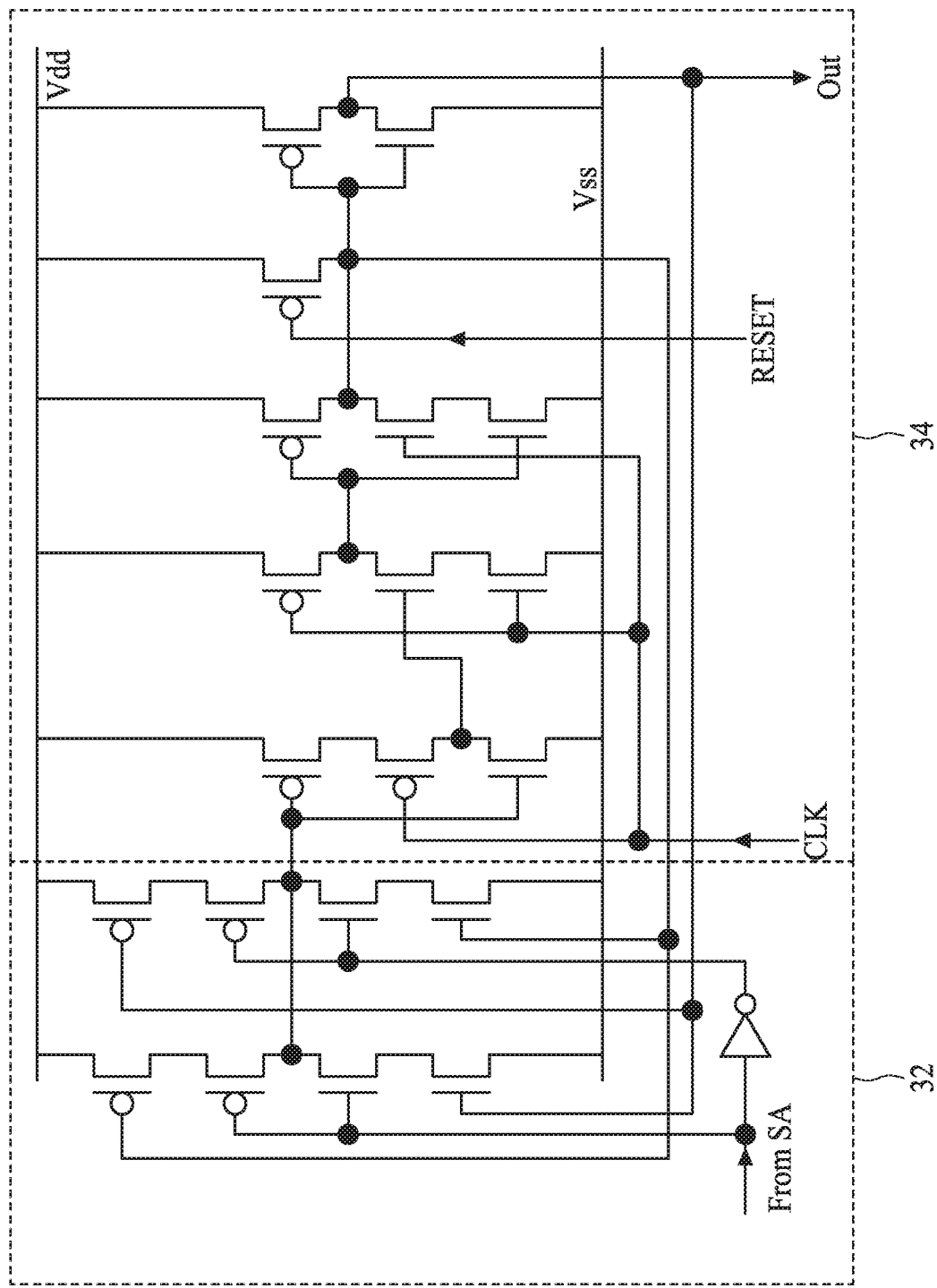
FIG. 3 is a more detailed circuit implementation of the compression circuit of FIG. 2, in accordance with some embodiments.

FIG. 3 (FIG. 3) illustrates a circuit diagram of an embodiment of the compressor 28 of FIG. 2. The circuit components corresponding to the XOR gate are located in the dashed box labeled with reference number 32, and the circuit components corresponding to the D flip-flop latch are located in the dashed box labeled with reference number 34.

Figure 4:
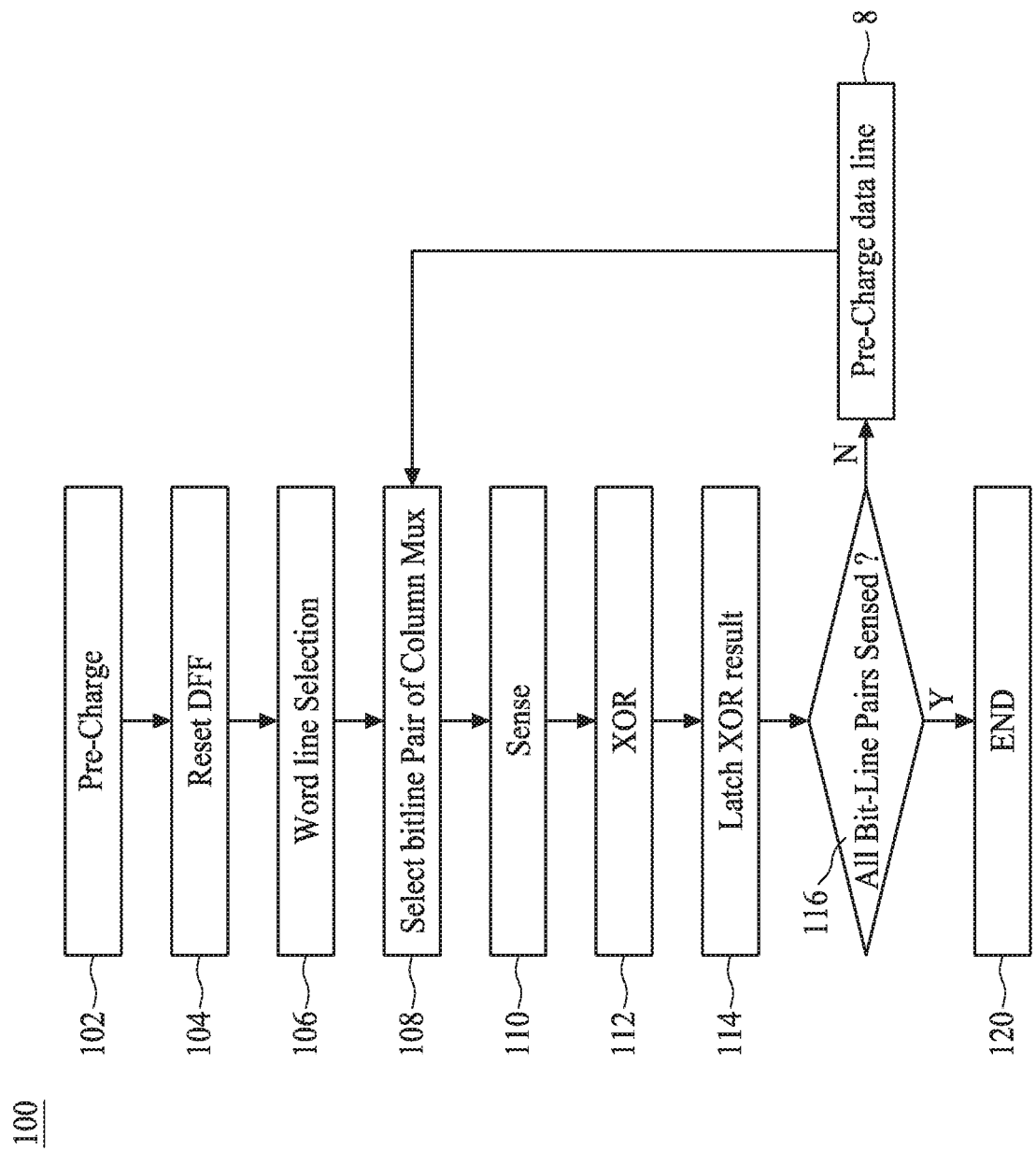
FIG. 4 illustrates a method of de-biasing PUF bits, in accordance with some embodiments.

FIG. 4 (FIG. 4) illustrates a method 100 corresponding to the sequence of steps implemented by the integrated circuit under control of controller 30 for compressing multiple bits of a group of multiplexed columns of bitlines into a single bit, and thereby reducing the bias attributable to the sense amplifier for that output bit of a unique bit vector (i.e., PUF signature) of an IC. It should be understood that the method of FIG. 4 is implemented in parallel for other groups of multiplexed columns, and their associated sense amplifiers, for a selected wordline. Thereafter, this method is repeated for each wordline, in succession, until an entire array 12 is read and the full bit vector is produced. Of course, as is known in the art, subsequent processing of this output vector is contemplated to, for example, implement error correction that account for errors. The de-biasing techniques described herein are in addition to those known techniques.

At step 102 of the method 100, a pre-charge operation is performed. Specifically, all bitlines associated with a given multiplexed group of bitlines (e.g., all of the bitlines 14 coupled to column multiplexer 24a in FIG. 1) and the data line (e.g., the output line of the sense amplifier 26a that is coupled to the de-biasing circuit 28a) are pre-charged.

At step 104, which may occur at the same time as step 102, the D flip-flop (DFF) latch of the compressor is reset.

At step 106, address decoding is performed and the word line associated with the decoded address is selected. This step involves decoding an address with row decoder 20 and driving the selected wordline.

At step 108, a bitline pair (e.g., 14a, 14b in FIG. 1) from the multiplexed group of bitline pairs is selected using the column MUX 24. The selected bitline pair is isolated from the other multiplexed bitline pairs at the column MUX 24.

At step 110, the selected bitline pair of the column group is sensed by the sense amplifier. This step involves driving the data line of the sense amplifier to full swing based on values at the bit generating cell 18 coupled to the selected bitline pair.

At step 112, the sensed value (i.e., the output of the sense amplifier on the data line) is XORed (or XNORed) with the current Q output of the D flip-flop. This step can involve provided the sensed value as a first input to an XOR (or XNOR) gate and providing the current Q output of the D flip-flop as the second input. At this first pass through, the Q output takes on whatever value the flip-flop takes on after reset.

At step 114, the output of the XOR operation is latched to the Q output of the D flip-flop.

At step 116, it is determined whether the last of the desired bitline pairs has been sensed. Assuming four columns per column MUX group, it may be desired to sense all four bitline pairs or some number less than all four bitline pairs.

If it is determined at step 116 that all bitline pairs have been sensed, then the process ends at step 120, with the Q output of the D flip-flop being the PUF output bit, which is the de-biased compression result.

If it is determined at step 116 that all bitline pairs have not been sensed, then the data line is again pre-charged at step 120 and the method returns to step 106 to select the next pair of bitlines from the column multiplex for sensing. The process is repeated until there are no more bitline pairs that need to be sensed.

As discussed above in connection with FIG. 4, after the each read, the newly read data is XORed with the previous read data stored in the latch (e.g., D flip-flop) and the new result is stored in the latch. While the method described above significantly reduces any offset bias attributable to the sense amplifiers, the method relies on compression, which results in loss of information when compared to other PUF designs. For example, in the embodiment illustrated in FIG. 1, where there is 4:1 muxing and compression, assuming X number of reads, the output is a vector having of X/4 length. That is, each de-biasing circuit compresses 4 bit reads into a single PUF bit, albeit a PUF bit with reduced bias. An averaging method is described in connection with FIG. 5 (FIG. 5) that can result in no, or less, loss of information.

Figure 5:
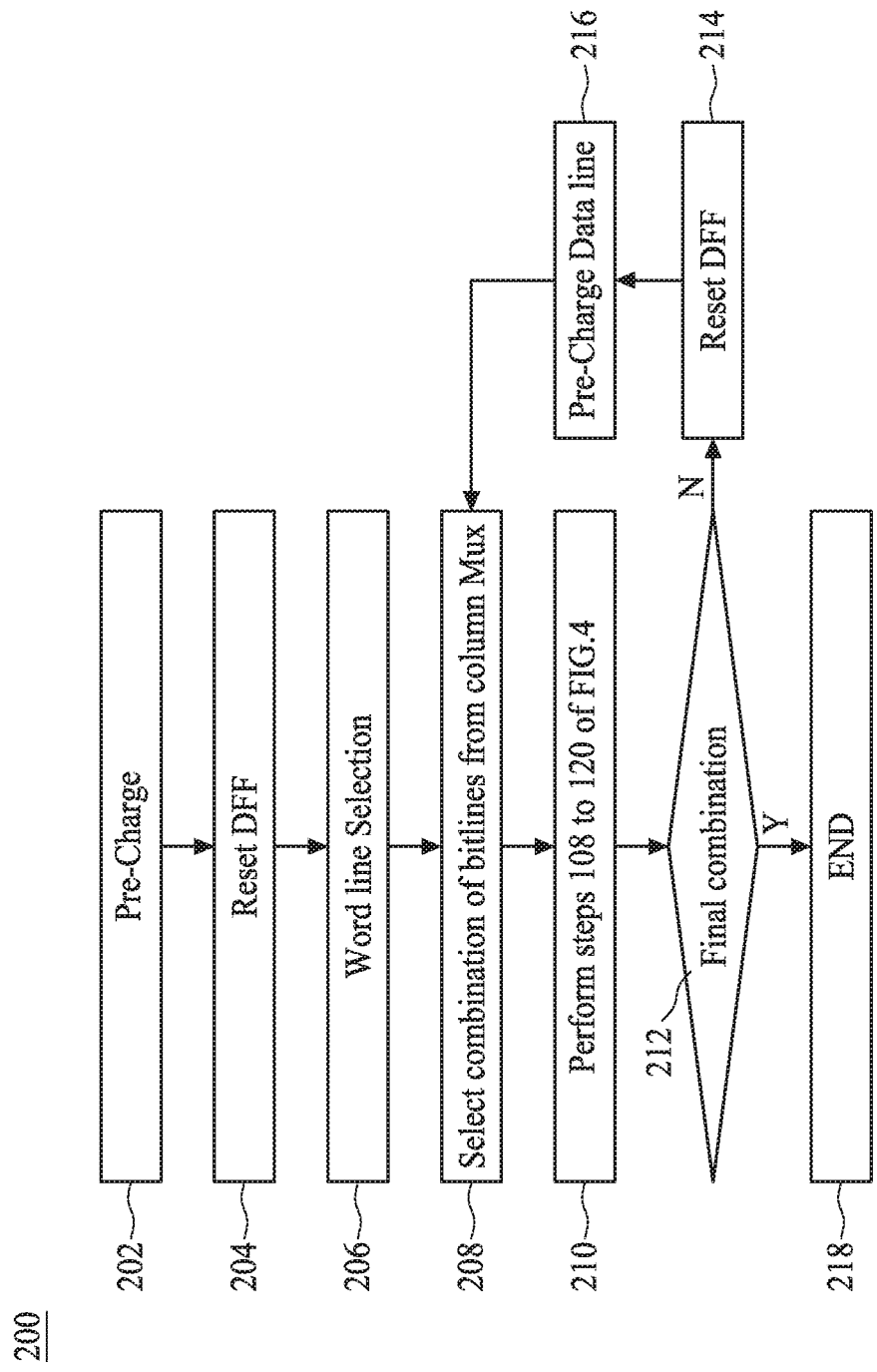
FIG. 5 illustrates a method of de-biasing PUF bits without loss, or with reduced loss, of information, in accordance with some embodiments.

In the method of FIG. 5, the PUF bit generation process described above in connection with FIG. 4 is repeated to provide an averaging out or canceling but for different subset combinations of the bitline pairs in a group of multiplexed columns. (With respect to averaging/canceling in a sense the effect is similar to compressing but without loss of bits. Returning to the example above regarding a coin toss, that example illustrated an averaging. If we toss a defective coin twice and take the combined outcome of HH, HT, TH and TT to represent the outcome we are doing averaging. A bias will be "averaged" out. Let's say we toss the same defective coin (0.6 probability for H and 0.4 probability for T) three times, we can get 8 possible outcomes and XOR results (shown in parentheses next to the outcome): (i) HHH (1); (ii) HET (0); (iii) HTH (0); (iv) HTT (1); (v) THH (0); (vi) THT (1); (vii) TTH (1); (viii) TTT (0), with respective probabilities as follows: 0.216, 0.144, 0.144, 0.096, 0.144, 0.096, 0.096, 0.064. Then the "average" of getting 1 is: 0.216+0.096+0.096+0.096=0.504. The average of getting "0" is =0.144+0.144+0.144+0.064=0.496.) Since the row decode need only be done once, there is no added latency with respect to that operation. Pre-charging is also done only once, so there is no additional overhead associated with the pre-charge operation. Any extra latency is attributable to the multiple cycling of the sense amplifier for sensing of the multiple bitlines.

Using the example of FIG. 1 where there are four pairs of bitlines per group of multiplexed columns, and thus four columns per sense amplifier, any three (of four total) bitlines pairs can be used (in the de-biasing method of FIG. 4) to produce a PUF bit output. Given these four bitlines, there are four possible combinations of three bitline pairs, i.e., (i) BL1, BL2, BL3; (ii) BL1, BL2, BL4; (iii) BL1, BL3, BL4; and (iv) BL2, BL3, BL4. If each of these combinations is used separately in the method of FIG. 4, then the result is 4 output bits (i.e., output bit #1 corresponds to BL1/BL2/BL3 combination; output bit #2 corresponds to BL1/BL2/BL4 combination; output bit #3 corresponds to BL1/BL3/BL4 combination; and output bit #4 corresponds to BL2/BL3/BL4 combination) rather than just 1 bit (i.e., one output bit corresponding to the combination of BL1/BL2/BL3/BL4), meaning there is no loss of information (as compared to using a methodology that does not involve de-biasing using compression). This operation essentially performs an averaging of biased output or canceling of the bias. Let's treat the output of each column as unbiased. But the shared sense amplifier adds a bias to each output since they all use the same sense amplifier. Now this added biased will cancel each other since they are being combined to form the final output. There are three biased outputs from the same sense amplifier and they are combined to cancel the bias. Of course, if three combinations (of the possible four combinations) are used, then the loss of information is only 25%. And if 2 combinations are used, then the loss of information is only 50%. This combination method is described below in connection with FIG. 5.

Steps 202, 204 and 206 of the method 200 illustrated in FIG. 5 are identical to steps 102, 104 and 106 of the method 100 of FIG. 4. That is, at step 202, a pre-charge operation is performed. Specifically, all bitlines associated with a given multiplexed group of bitlines (e.g., all of the bitlines 14 coupled to column multiplexer 24a in FIG. 1) and the data line (e.g., the output line of the sense amplifier 26a that is coupled to the compressor 28a) are pre-charged. And at step 204, which may occur at the same time as step 202, the D flip-flop (DFF) latch of the compressor is reset. At step 206 the wordline corresponding to the decoded address is selected.

At step 208, a subset combination of the bitline pairs from the group of multiplexed columns is selected. Using our example above, the first combination may be bitline pairs BL1, BL2, BL3. Using this combination of bitline pairs, at step 210 the steps 108 to 120 of the method 100 of FIG. 4 are performed. That is, BL1 is sensed and its output is XORed and latched to the output of the latch. Then BL2 is sensed, and its output is XORed with the current output of the latch, and then that result is latched to the output of the latch. Finally, BL3 is sensed, and its output is XORed with the current output of the latch and then that result is latched to the output of the latch. This final output represents one PUF bit of the bit vector.

At step 212, it is checked whether the combination that was just used in steps 208 and 210 is the final combination to be processed of the set of columns coupled to the sense amplifier through the column multiplexer. If it determined at step 212 that it is the final combination to be processed, then the method ends at step 214.

If it is determined at step 212 that it is not the final combination, then the latch is reset at step 214, the data line is pre-charged at step 216 and the method proceeds back to step 208 for selection of the next combination, e.g., the combination BL1, BL2, BL4. This combination is then processed to provide the second PUF bit output described above. Using our example, the process will be repeated to process the third combination (BL1, BL3, BL4) and fourth combination (BL2, BL3, BL4), resulting in a total of four output PUF bits, with reduced sense amplifier bias and no loss of information, i.e., four bit generating cells were used to generate a total of four PUF bits.

Figure 8:
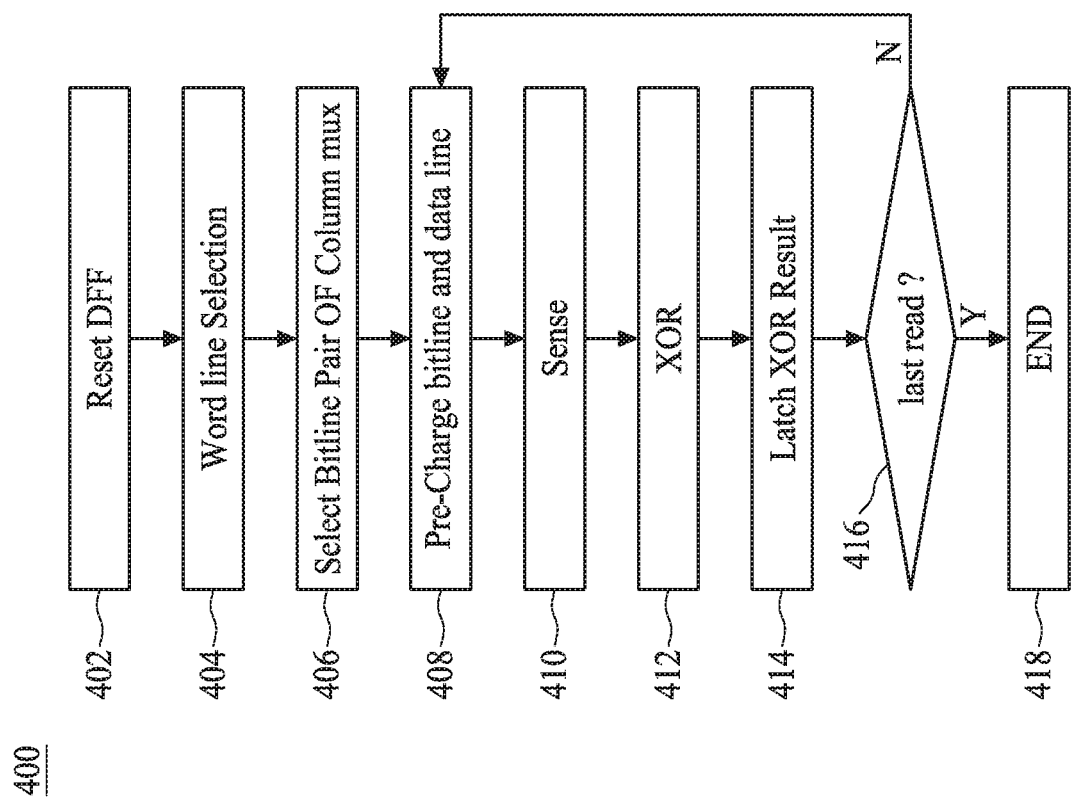
FIG. 8 illustrate a method of de-biasing PUF bits, in accordance with some embodiments.

It should be appreciated that in certain embodiments, sense amplifier bias can be reduced by repeated reads from the same column. This approach is effectively like tossing the same defective coin multiple times. An embodiment of a method 400 is illustrated in FIG. 8. At 402, the latch of the de-biasing circuit is reset. At step 404, the word line is selected. At step 406, the bitline pair of the column multiplexert is selected. At step 408, both the selected bitline pair and data line are pre-charged. At step 410, the bit is sensed. At step 412, the output of the sense operation is XORed (or XNORed) with the current Q output of the D flip-flop. At 416, it is determined if the the selected cell has been read the pre-selected number of times. If not, the method returns to step 408, as there is a need to pre-charge the coulumn again since the read to the same column will disturb the bitline voltage after the sense amplifier operation. When the pre-selected number of reads (e.g., 2 to 4 reads in certain embodiments) is reached at step 416, the method ends.

Embodiments of the de-biasing technique described herein provide particular benefits in the "speed-compare" style of PUF. Embodiments of this style of PUF are described in detail in co-pending, commonly assigned U.S. patent application Ser. No. 15/288,342, entitled "SRAM-based Authentication Circuit", filed Oct. 7, 2016, the entirety of which is hereby incorporated by reference herein. As described above, and in the '342 Patent Application, the bit generating cells can be implemented as simple transistor pairs that are used in a speed-compare style of PUF. A This implementation is illustrated in FIG. 6, though it should be understood that other PUF bit generating techniques, such as using SRAM cells described in the '342 Patent Application, may also be used.

Figure 6:
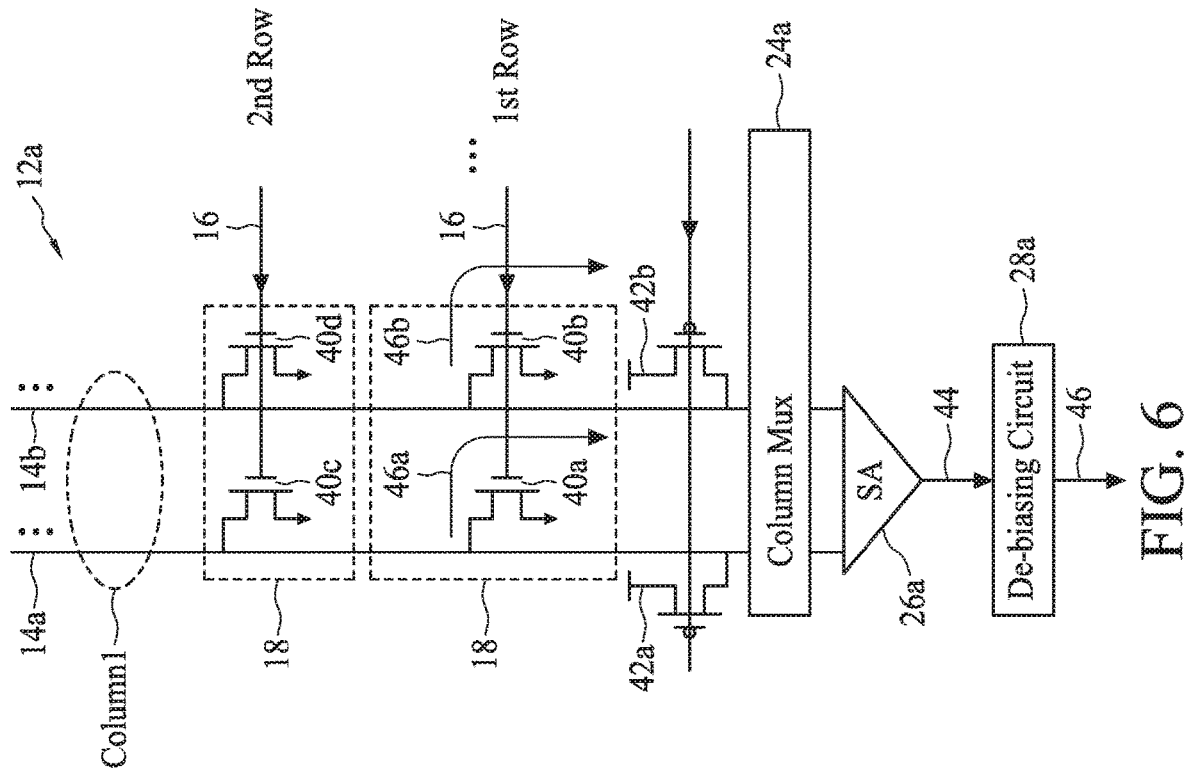
FIG. 6 illustrates additional details of the integrated circuit device of FIG. 1, in accordance with some embodiments.

With reference to FIG. 6 (FIG. 6), components illustrate in FIG. 1 are illustrated in FIG. 6 using the same reference number. For brevity, only one columns and two rows are shown in FIG. 6 Specifically, FIG. 6 shows a portion of FIG. 1, including one de-biasing circuit 28a, one sense amplifier 26a, one column multiplexer 24a, one column, having associated with one pair of bitlines 14a, 14b and two rows 16 (labeled "$1^{st}$ Row" and "$2^{nd}$ Row"). FIG. 6 shows that the array 12 of PUF bit generating elements 18 is implemented as a logic NMOS array 12a. As described in the '342 Application, the array may also be implemented as a PMOS array or a hybrid logic NMOS and PMOS array.

The MOS array 12a of FIG. 6 includes plural logic NMOS transistors 40a, 40b, 40c, 40d, which are arranged in a column-row configuration. The logic NMOS array 12a further includes plural pre-charge transistors 42, specifically a pre-charge transistor for each bitline. Accordingly, each bitline 14 is coupled to the logic NMOS transistors disposed therein, and each row includes a wordline 16 that is coupled to the logic NMOS transistors disposed therein. As shown, the first bitline 14a includes logic NMOS transistors 40a, 40c etc., that are disposed along the first bitline 14a; the second bitline 14b includes logic NMOS transistors 40b, 40d, etc., that are disposed along the second bitline 14b; the first row includes logic NMOS transistors 40a, 40b, etc., that are disposed along the first row and coupled to a wordline 16; the second row includes logic NMOS transistors 40c, 40d, etc., that are disposed along the second row and coupled to a respective wordline 16; and so on. In some embodiments, each of the logic NMOS transistors is coupled to the respective bitline at its drain end and to a voltage level (e.g., ground) at its source end. Further, each wordline 16 is configured to provide an assertion signal to gates of coupled logic NMOS transistors so as to turn on one or more respective logic NMOS transistors.

Regarding the pre-charge transistors 42a, 42b, in the illustrated embodiment of FIG. 6, each of the pre-charge transistors may be implemented as a PMOS transistor. Such a pre-charge transistor is coupled to a bitline, and configured to receive a pre-charge control signal so as to cause itself to be turned on. The authentication circuit coupled to the logic NMOS array 12a is substantially similar to the above-described embodiments as including plural sense amplifiers 26, wherein each sense amplifier is coupled to a bitline pair 14a, 14b through a respective column multiplexer 24. In some embodiments, each of the sense amplifiers 26 of the authentication circuit may include a voltage-mode sense amplifier. In some other embodiments, the sense amplifier may include a current-mode sense amplifier. Operations of the logic NMOS array 12a and corresponding authentication circuit, discussed below, will be directed to implementing the sense amplifier as a voltage-mode sense amplifier.

In some embodiments, for the sense amplifier 26a and de-biasing circuit 28a to generate a de-biased output bit 48 based on the difference of discharging rates, in some embodiments, the bitlines 14a, 14b are first pre-charged to Vdd. Then a row is selected so that the sense amplifier of the authentication circuit is allowed to compare the discharging rates present on the respective bitlines. A column is selected using the column multiplexer, such that the corresponding bitline pair is coupled to the sense amplifier.

For example, the 1st row is selected by setting an assertion signal to high. As such, the logic NMOS transistors (e.g., 40a, 40b, etc.) are turned on. In some embodiments, concurrently, the pre-charge control signal is asserted to high, which accordingly turns off the pre-charge transistors 42a, 42b. Consequently, discharging paths 46a, 46b are formed from the bitline 14a, through the logic NMOS transistor 40a, to ground, and from the bitline 14b, through the logic NMOS transistor 40b, to ground, respectively, and as such, voltage levels present on the bitlines 14a and 14b start to drop with respective discharging rates. Once the difference between the voltages levels on the bitlines 14a and 14b exceeds a pre-defined threshold ($\Delta V$), an output bit 44 is generated by the sense amplifier 26a and provided to the de-biasing circuit 28a for generating an output PUF bit 46 of a PUF signature. It should be understood that as described above in connection with FIGS. 4 and 5, the output PUF bit 46 is produced based on multiple reads by the sense amplifiers from multiple columns coupled to the column multiplexer 24a.

Returning to the example described above, where the process is repeated serially to further reduce the bias, i.e., $4n$ bits can be compressed to n bits, e.g., by performing a logical XOR on two pairs first then a logical XOR on the output of these two XOR pairs, embodiment of a debiasing arrangement is shown in FIG. 7. FIG. 7 shows an embodiment of a modified debiasing circuit 328 coupled to an output of a sense amplifier 326. This debiasing circuit 328 could be substituted for each debiasing circuit 28 in FIG. 1. In certain embodiments of the debiasing circuit 328, there are total of 3 XOR gates arranged as a tree. The first level has two XOR gates 332a and 332b. The debiasing circuit also includes three latches 334a, 334b, 334c arranged in series, with the output of latch 334c coupled to one input of XOR 332b, the output of latch 334b coupled to the other input of XOR 332b, and the output of latch 334a coupled to one input of XOR 332a. The other input of XOR 332a is coupled to the output of sense amplifier 326.

In operation according to an embodiment, during a first cycle, a first column (e.g., $Col_0$) is selected to produce a first sense output using sense amplifier 326. During a next cycle, the first output is latched by latch 334a and a second column (e.g., $Col_1$) is selected to produce a second sense output using sense amplifier 326. During the next cycle, the first output is latched to the output of latch 334b, the second output is latched to the output of latch 334a, and a third column (e.g., $Col_2$) is selected to produce a third sense output using sense amplifier 326. Finally, during a fourth cycle, the first output is latched to the output of latch 334c, the second output is latched to the output of latch 334b, the third output is latched to the output of latch 334a, and a fourth column (e.g., $Col_3$) is selected to produce a fourth output at the output of sense amplifier 326. It should be appreciated that the serially connected latches 334 operate as a shift register. At this point, the outputs from $Col_0$ and $Col_1$ are inputs to XOR 332b and the outputs from $Col_2$ and $Col_3$ are inputs to XOR 332a. The outputs of these two XORs 332a, 332b are the inputs to the last XOR 332c, which provides the output of the compression circuit.

As described above, certain embodiments provide for removing or substantially reducing sense bias attributable to sense amplifiers used in producing a PUF signature. In certain embodiments, this de-biasing results in an improved PUF signature for use in authentication techniques for an IC. Certain embodiments involve no loss of information with little additional overhead.

In an embodiment of an integrated circuit device, the integrated circuit device includes an array including a plurality of bit generating cells arranged in a plurality of rows and columns, each bit generating cell associated with a respective row and column combination, and a physically unclonable function (PUF) generator. The PUF generator includes a plurality of column multiplexers, each column multiplexer coupled to a plurality of the columns from the array; a plurality of sense amplifiers, each sense amplifier being associated with a respective one of the column multiplexers; and a plurality of de-biasing circuits, each de-biasing circuit associated with a respective column multiplexer and coupled to an output of a respective one of the sense amplifiers. Each de-biasing circuit is operable to provide an output for generating a PUF signature that is dependent on more than one sensed bit from the bit generating cells associated with the columns coupled to the de-biasing circuit's respective column multiplexer, whereby a sensing bias of the sense amplifier to which the de-biasing circuit is coupled is reduced. In certain embodiments, each de-biasing circuit includes a XOR or XNOR logic gate and a data latch having an input coupled to an output of the logic gate. In certain embodiments, the data latch has an output coupled to a first input of the logic gate and the logic gate has a second input coupled to the output of the respective sense amplifier. In certain embodiments, the data latch is a D flip-flop. In certain embodiments, the integrated circuit device further includes a controller, the controller operable to control each column multiplexer to sequentially connect a different one of the columns to the sense amplifier associated with the column multiplexor. In certain embodiments, the output for generating the PUF signature is produced dependent on sensed bits from bit generating cells associated with all columns coupled to the column multiplexer. In certain embodiments, the de-biasing circuit output is produced dependent on sensed bits from bit generating cells associated with a first subset of all columns coupled to the column multiplexer. In certain embodiments, the integrated circuit device is configured to produce a second de-biasing circuit output for generating a second PUF signature dependent on sensed bits from bit generating cells associated with a second subset of all columns coupled to the column multiplexer. In certain embodiments, X number of columns are coupled to each column multiplexer, wherein for each selected wordline and each column multiplexer the integrated circuit is configured to produce X number of outputs that are dependent on sensed bits from bit generating cells associated with X number of subsets of the X number of columns coupled to the column multiplexer, where X is an integer number that is 4 or greater. In certain embodiments, the PUF generator is configured to provide the output for generating the PUF signature by comparing speeds associated with different elements within the bit generating cell. In certain embodiments, for each generating cell, the elements include a first transistor coupled a first bitline and a wordline and a second transistor coupled to a second bitline and the wordline. In certain embodiments, the first and second bitlines are adjacent bitlines and form a bitline pair corresponding to a column, and wherein each column multiplexer is coupled to a plurality of bitline pairs and configured to select from the plurality of bitline pairs for coupling to the respective sense amplifier.

In another embodiment, a method of reducing sense-amplifier bias in generating a PUF signature includes: providing an array of bit generating cells arranged in a plurality of rows and columns, each bit generating cell associated with a respective row and column combination; coupling through a column multiplexer a first set of the columns to a first sense amplifier; selecting a row; sensing using the first sense amplifier multiple bits from the bit generating cells in the selected row and associated with the first set of columns; and producing an output for generating a PUF signature that is dependent on the multiple bits using a logic operation that reduces the sense amplifier bias of the first sense amplifier. In certain embodiments, the logic operation includes a XOR or XNOR operation. In certain embodiments, the sensing and producing steps include the steps of: (a) selecting a first column from the first set of columns; (b) sensing with the first sense amplifier a first bit from a first bit generating cell in the first column; (c) performing the logic operation using the sensed first bit as an input; (d) latching an output of the logic operation to provide a latched output; (e) selecting another column from the first set of columns; (f) sensing with the first sense amplifier another bit from another bit generating cell in the another column; (g) performing the logic operation using the another bit as a first input and the latched output from step (d) as a second input to provide another output; (h) latching the another output of the logic operation to the latched output; and (i) repeating steps (e) to (h) until a last selected column from the first set of columns has been used, wherein after completion of step (i), the latched output corresponds to the output for generating a PUF signature. In certain embodiments, the output for generating the PUF signature is produced dependent on sensed bits from bit generating cells associated with all columns from the first set of columns. In certain embodiments, the output for generating the PUF signature is produced dependent on sensed bits from bit generating cells associated with a first subset of the first set of columns. In certain embodiments, method further includes producing a second output for generating a second PUF signature that is dependent on sensed bits from bit generating cells associated with a second subset of the first set of columns. In certain embodiments, there are X number of columns in the first set of columns, and the method includes producing X number of outputs dependent on sensed bits from bit generating cells associated with X respective number of subsets of the X number of columns in the first set of columns, wherein X an integer number that is 4 or greater.

In yet another embodiment, an integrated circuit device includes an array including a plurality of bit generating cells arranged in a plurality of rows and columns, each bit generating cell associated with a respective row and column combination, each column corresponding to a respective bitline pair coupled to bit generating cells in the column; a physically unclonable function (PUF) generator, including:

a plurality of column multiplexers, each column multiplexer coupled to a respective set of columns from the array; a plurality of sense amplifiers, each sense amplifier coupled to an a respective one of the column multiplexers; and a plurality of de-biasing circuits, each de-biasing circuit coupled to an output of a respective one of the sense amplifiers, wherein each de-biasing circuit includes a XOR or XNOR logic gate having first and second inputs and an output and data latch having a data input and a data output, wherein first input of the logic gate is coupled to the output of the respective sense amplifier and the second input is coupled to the data output of the data latch; and a controller, the controller operable to control the PUF generator to output a vector of PUF bits, outputs for producing the PUF bits being produced at the data output of the data latches of the de-biasing circuits, wherein each output for producing the PUF bit is dependent on more than one sensed bit from the bit generating cells such that sensing bias of the sense amplifiers is reduced.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit device comprising:
   an array comprising a plurality of bit generating cells arranged in a plurality of rows and columns, each bit generating cell associated with a respective row and column combination;
   a physically unclonable function (PUF) generator, comprising:
   a plurality of column multiplexers, each column multiplexer coupled to a plurality of the columns from the array;
   a plurality of sense amplifiers, each sense amplifier being associated with a respective one of the column multiplexers, wherein any offset in a respective sense amplifier from the plurality of sense amplifiers produces a sensing bias in a detection output of the respective sense amplifier; and
   a plurality of de-biasing circuits, each de-biasing circuit associated with a respective column multiplexer and coupled to an output of a respective one of the sense amplifiers;
   wherein each de-biasing circuit is operable to provide an output for generating a PUF signature that is dependent on more than one sensed bit from the bit generating cells associated with the columns coupled to the de-biasing circuit's respective column multiplexer to reduce the sensing bias of the sense amplifier to which the de-biasing circuit is coupled.

2. The integrated circuit device of claim 1, wherein each de-biasing circuit comprises:
   a XOR or XNOR logic gate; and
   a data latch having an input coupled to an output of the logic gate.

3. The integrated circuit device of claim 2, wherein the data latch has an output coupled to a first input of the logic gate and the logic gate has a second input coupled to the output of the respective sense amplifier.

4. The integrated circuit device of claim 3, wherein the data latch is a D flip-flop.

5. The integrated circuit device of claim 1, further comprising a controller, the controller operable to control each column multiplexer to sequentially connect a different one of the columns to the sense amplifier associated with the column multiplexor.

6. The integrated circuit device of claim 1, wherein the output for generating the PUF signature is produced dependent on sensed bits from bit generating cells associated with all columns coupled to the column multiplexer.

7. The integrated circuit device of claim 1, wherein the de-biasing circuit output is produced dependent on sensed bits from bit generating cells associated with a first subset of all columns coupled to the column multiplexer.

8. The integrated circuit device of claim 7, wherein the integrated circuit device is configured to produce a second de-biasing circuit output for generating a second PUF signature dependent on sensed bits from bit generating cells associated with a second subset of all columns coupled to the column multiplexer.

9. The integrated circuit device of claim 8, wherein X number of columns are coupled to each column multiplexer, wherein for each selected wordline and each column multiplexer the integrated circuit device is configured to produce X number of outputs that are dependent on sensed bits from bit generating cells associated with X number of subsets of the X number of columns coupled to the column multiplexer, where X is an integer number that is 4 or greater.

10. The integrated circuit device of claim 1, wherein the PUF generator is configured to provide the output for generating the PUF signature by comparing speeds associated with different elements within the bit generating cell.

11. The integrated circuit device of claim 10, wherein for each generating cell, the elements include a first transistor coupled a first bitline and a wordline and a second transistor coupled to a second bitline and the wordline.

12. The integrated circuit device of claim 11, wherein the first and second bitlines are adjacent bitlines and form a bitline pair corresponding to a column, and wherein each column multiplexer is coupled to a plurality of bitline pairs and configured to select from the plurality of bitline pairs for coupling to the respective sense amplifier.

13. A method of reducing sense-amplifier bias in generating a physically unclonable function (PUF) signature comprising:
   providing an array of bit generating cells arranged in a plurality of rows and columns, each bit generating cell associated with a respective row and column combination;
   coupling through a column multiplexer a first set of the columns to a first sense amplifier, wherein any offset in the first sense amplifier produces a sensing bias in a detection output of the first sense amplifier;
   selecting a row;
   sensing using the first sense amplifier multiple bits from the bit generating cells in the selected row and associated with the first set of columns; and
   producing an output for generating a PUF signature that is dependent on the multiple bits using a logic operation that reduces the sense amplifier bias of the first sense amplifier.

14. The method of claim 13, wherein the logic operation comprises a XOR or XNOR operation.

15. The method of claim 14, wherein the sensing and producing steps comprise the steps of:
  (a) selecting a first column from the first set of columns;
  (b) sensing with the first sense amplifier a first bit from a first bit generating cell in the first column;
  (c) performing the logic operation using the sensed first bit as an input;
  (d) latching an output of the logic operation to provide a latched output;
  (e) selecting another column from the first set of columns;
  (f) sensing with the first sense amplifier another bit from another bit generating cell in the another column;
  (g) performing the logic operation using the another bit as a first input and the latched output from step (d) as a second input to provide another output;
  (h) latching the another output of the logic operation to the latched output; and
  (i) repeating steps (e) to (h) until a last selected column from the first set of columns has been used,
  wherein after completion of step (i), the latched output corresponds to the output for generating a PUF signature.

16. The method of claim 13, wherein the output for generating the PUF signature is produced dependent on sensed bits from bit generating cells associated with all columns from the first set of columns.

17. The method of claim 13, wherein the output for generating the PUF signature is produced dependent on sensed bits from bit generating cells associated with a first subset of the first set of columns.

18. The method of claim 17, wherein the method further comprises producing a second output for generating a second PUF signature that is dependent on sensed bits from bit generating cells associated with a second subset of the first set of columns.

19. The method of claim 18, wherein there are X number of columns in the first set of columns, and the method comprises producing X number of outputs dependent on sensed bits from bit generating cells associated with X respective number of subsets of the X number of columns in the first set of columns, wherein X an integer number that is 4 or greater.

20. An integrated circuit device comprising:
  an array comprising a plurality of bit generating cells arranged in a plurality of rows and columns, each bit generating cell associated with a respective row and column combination, each column corresponding to a respective bitline pair coupled to bit generating cells in the column;
  a physically unclonable function (PUF) generator, comprising:
    a plurality of column multiplexers, each column multiplexer coupled to a respective set of columns from the array;
    a plurality of sense amplifiers, each sense amplifier coupled to a respective one of the column multiplexers, wherein any offset in a respective sense amplifier from the plurality of sense amplifiers produces a sensing bias in a detection output of the respective sense amplifier; and
    a plurality of de-biasing circuits, each de-biasing circuit coupled to an output of a respective one of the sense amplifiers, wherein each de-biasing circuit comprises a XOR or XNOR logic gate having first and second inputs and an output a and data latch having a data input and a data output, wherein first input of the logic gate is coupled to the output of the respective sense amplifier and the second input is coupled to the data output of the data latch; and
  a controller, the controller operable to control the PUF generator to output a vector of PUF bits, outputs for producing the PUF bits being produced at the data output of the data latches of the de-biasing circuits, wherein each output for producing the PUF bit is dependent on more than one sensed bit from the bit generating cells such that sensing bias of the sense amplifiers is reduced.

* * * * *